United States Patent [19]
Helgeson et al.

[11] Patent Number: 5,455,123
[45] Date of Patent: Oct. 3, 1995

[54] METHOD FOR MAKING AN ELECTROCHEMICAL CELL

[75] Inventors: William D. Helgeson, Minneapolis; Craig L. Schmidt, Eagan; Bernard F. Heller, Fridley; Daniel D. Michels, Brooklyn Center, all of Minn.

[73] Assignee: Medtronic, Inc., Minneapolis, Minn.

[21] Appl. No.: 195,957

[22] Filed: Feb. 14, 1994

[51] Int. Cl.$^6$ .................................................. H01M 10/44
[52] U.S. Cl. ........................... 429/52; 429/191; 429/199
[58] Field of Search .......................... 429/199, 48, 191, 429/213, 52

[56] References Cited

U.S. PATENT DOCUMENTS

| | | | |
|---|---|---|---|
| 3,957,533 | 5/1976 | Mead . | |
| 4,182,798 | 1/1980 | Skarstad | 429/213 |
| 4,296,185 | 10/1981 | Catanzarite | 429/48 |
| 4,315,975 | 2/1982 | Sekido et al. | 429/191 |
| 4,318,967 | 3/1982 | Ruetschi | 429/48 |
| 4,332,865 | 6/1982 | Sotomura | 429/48 |
| 4,430,397 | 2/1984 | Untereker | 429/191 |
| 4,707,422 | 11/1987 | de Neufville et al. | 429/48 |
| 4,761,355 | 8/1988 | Skarstad | 429/213 |
| 4,789,610 | 12/1988 | Kondo et al. | 429/191 |
| 4,960,657 | 10/1990 | Masuda et al. | 429/194 |
| 4,997,730 | 3/1991 | Morigaki et al. | 429/48 |

Primary Examiner—Stephen Kalafut
Assistant Examiner—Richard H. Lilley
Attorney, Agent, or Firm—Daniel W. Latham; Harold R. Patton

[57] ABSTRACT

A method for making a primary cell comprising a lithium anode and an iodine containing cathode. The cell is first subjected to a preliminary conditioning at a predetermined time/temperature to effect a reduction in the impedance of the cell followed by cell discharge of at least 2 mAh per cm$^2$ of the lithium anode surface prior to use or extended storage of the cell. The resulting primary cell has reduced variation in cell voltage and resistance and slower and more consistent self-discharge characteristics.

5 Claims, 5 Drawing Sheets

METHOD FOR MAKING AN ELECTROCHEMICAL CELL

BACKGROUND OF THE INVENTION

This invention relates to the conversion of chemical energy to electrical energy and more particularly to a process for producing a primary cell which comprises lithium as an active metal anode and an iodine-containing cathode material.

One area of use for such electrochemical cells is for providing electrical power to inaccessible devices such as implanted cardiac pacemakers. However, they may also be applicable to a wide variety of devices requiring primary batteries intended to provide relatively high voltage and high energy density over long life under low current drain conditions.

Such cells may be constructed, to form electrolytes in situ. For example, when the electrochemically active ingredients are lithium and iodine, a solid lithium iodide electrolyte forms between the anode and cathode after the cell has been constructed. Alternatively, the electrolyte can be preformed in whole or in part. For example, one might make use of the following arrangement: $Li/LiI(Al_2O_3)/PEO.nI_2$. Such an arrangement might be desirable for modifying a self-discharge rate. Such alumina dispersions are reported in C. C. Liang, J. Electrochem. Soc. 120, pg 1289 (1973); C. C. Liang and L. H. Barnette, J. Electrochem. Soc. 123, pg 453 (1976), and Liang U.S. Pat. No. 3,713,897, all of which are incorporated herein by reference.

Another modification which may be incorporated in these cells as a part of the operative relationship thereof is the use of an anode coated with poly(2-vinylpyridine) (P2VP) or other polymeric material such as described in the U.S. Mead et al., U.S. Pat. No. 3,957,533 or a self-supporting poly(2-vinylpyridine) body such as described in the U.S. Skarstad, U.S. Pat. No. 4,182,798. The subject matter of these patents is incorporated herein by reference. $I_2/P2VP$ cathodes according to this invention when used with such lithium/P2VP anodes provide a battery of unusually high rate capability for this type of cell.

After the fabrication of the cell, the solid electrolyte layer continuously grows through the above mentioned self-discharge reaction due to the diffusion of iodine from the cathode through the layer. With the growth of the layer, the internal resistance of the cell increases proportionally to the square root of the storage period of the cell, reflecting the increasing difficulty of the iodine diffusion through the layer.

This formation of the layer, however, does not necessarily occur uniformly over the entire lithium surface. Particularly when the cell is stored at a high temperature, such as at 45° C. or 60° C. for example, the lithium anode is consumed locally intensively by the reaction with the iodine, consequently forming pits in the lithium surface. Such a phenomenon is often observed in metallic corrosion and is called pitting corrosion.

The intensively corroded portions of the lithium anode are substantially inactive to cell discharge reaction due to a thick electrolyte layer formed thereon and the effective area of the lithium anode is thereby reduced. When the cell thus stored is subjected to the cell discharge, the slope of the discharge curve of the cell becomes steep in comparison with that obtained immediately after the fabrication of the cell, reflecting reduction in the effective area of the lithium anode. Also, significant variation in cell-to-cell voltage and resistance is developed during self-discharge.

In U.S. Pat. No. 4,332,865 issued to Sotomura, et. al., which is incorporated herein by reference, this problem is addressed in a solid electrolyte cell by subjecting the cell, immediately after its fabrication, to preliminary cell discharge until the amount of the discharge reaches at least 2 mAh per $cm^2$ of the lithium anode surface, or alternatively the cell is subjected to self-discharge at a temperature of not more than 30° C. until the amount of the self-discharge reaches at least 3 mAh per $cm^2$ of the lithium anode surface. However, we have found that in certain cells, such immediate predischarge provides a cell with higher than desired impedance and greater than desired voltage variation during initial discharge.

The objects of the present invention are therefore to provide an improved process for producing a primary cell in which variation in cell voltage and impedance are reduced and in which self-discharge during storage is slower and more consistent.

SUMMARY OF THE INVENTION

We have discovered an improved method for making a lithium-iodine electrochemical cell comprising the steps of (a) conditioning the cell at a temperature above 30° C. for a period of time which is effective to produce a reduction in cell impedance; and (b) subjecting the conditioned cell to discharge until the amount of such discharge reaches at least 2 mAh per $cm^2$ of the lithium anode surface. These conditioning steps are to be undertaken before any use of the cell and before any storage of the cell.

DETAILED DESCRIPTION OF THE INVENTION

According to the method of the present invention, the lithium-iodine electrochemical cell is first constructed in a conventional manner. For example, the cell could be generally constructed as set forth in U.S. Pat. No. 4,332,865 issued to Sotomura, et. al., U.S. Pat. No. 4,761,355 issued to Skarstad, et. al. or as set forth in U.S. Pat. No. 4,430,397 issued to Untereker which are incorporated herein by reference. Cells of the type described therein require no electrolyte as initially constructed. However, following assembly, an electrolyte does form in situ. The electrolyte builds up between the cathode and the anode, usually taking the form of a layer, due to the reaction between the anode metal and the iodine in the cathode. For example, in a cell having a lithium anode and iodine in the cathode, a lithium iodide electrolyte will form.

Figure 1:
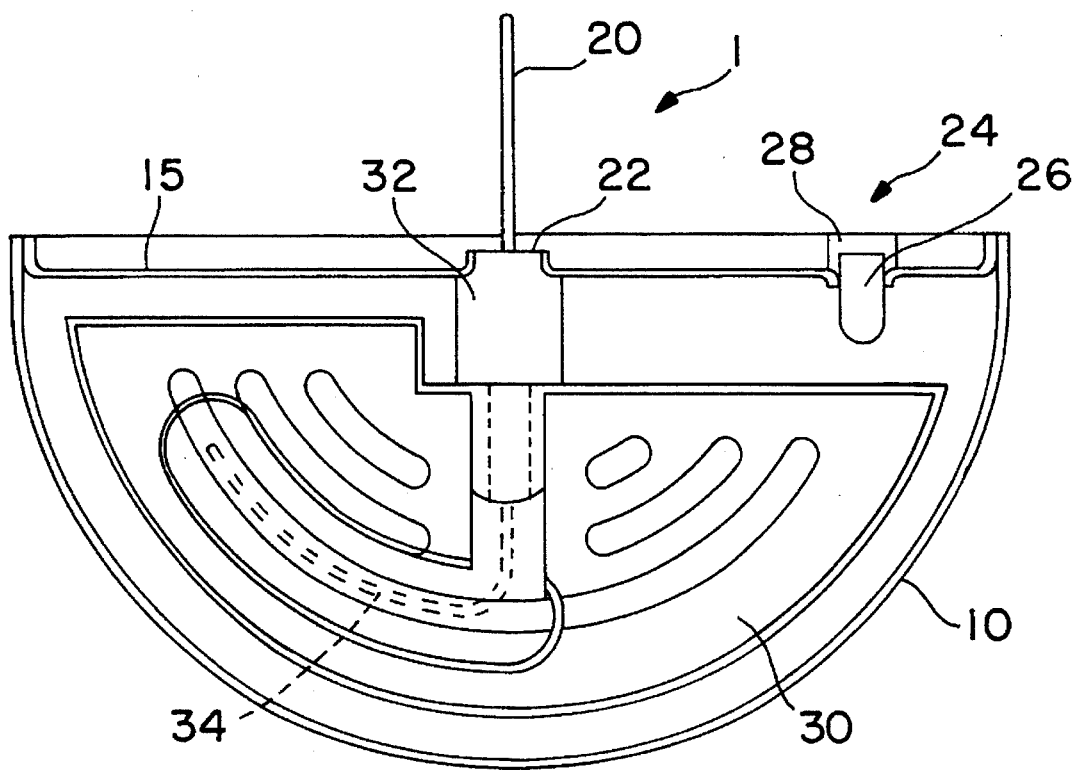
FIG. 1 is a cross sectional view of a lithium-iodine electrochemical cell.

One possible cell construction could be as shown in FIG. 1. FIG. 1 shows a lithium-iodine cell 1 of a type commonly used to power implantable medical devices. The enclosure consists mainly of a stainless steel case 10 and cover 15 welded to the case 10 with a feedthrough pin 20 projecting through the cover 15 by means of a glassed-in feedthrough 22. A fill port 24 is used to fill the cell 1 with an iodine cathode component of $I_2$/P2VP. The fill port is then sealed with a plug 26 and a cover 28 to complete a hermetic seal for the cell 1. Internally, the cell 1 includes an anode 30 spaced apart from the case 10 and cover 15 by a polymeric feedthrough insulator 32. The anode 30 consists of two lithium pieces, pressed together with the current collecting feedthrough pin 34 sandwiched between the two lithium pieces. A thin P2VP film (not shown) is pressure bonded to the external surface of the anode 30.

Once construction of the cell is completed and its components are sealed in a case, it is subjected to a conditioning step followed by a separate discharge step before storing the cell or placing the cell in service. The conditioning step generally requires that the cell be held for a predetermined time/temperature such that the impedance of the cell is reduced. The period of time for the conditioning step can be varied widely according to the temperature at which the cell is conditioned. The cell could be conditioned at a temperature as low as 30° C. or at a temperature as high as the melting point of the cathode material. For example, the cell may be conditioned for as little as one hour at 75° C. and as long as fifteen days at 30° C. Preferably, in order to reduce the time required for conditioning, the conditioning period is carried out at about 45°–90° C. and most preferably at about 75° C. A conditioning period of about 1 to 4 hours at 75° C. is capable of providing a reduction in cell impedance of more than 75%. Typically, a reduction in cell impedance from the conditioning step of as little as 15% will provide improvement in cell performance but, preferably, a reduction in cell impedance after conditioning of 50–80% is desired.

Once the conditioning of the cell is completed, the cell is subjected to the discharge step in which the cell is discharged until the amount of such discharge reaches at least 2 mAh per $cm^2$ of the lithium anode surface. The rate of discharge for this step is not critical. For example, discharges ranging from 0.25 mA to 10 mA per $cm^2$ of anode area can be used. Additionally, the temperature at which the discharge is applied is not critical. Temperatures in the range of about 20° C. to about 75° C. could be used. Preferably, for lithium-iodine cells used for implantable medical devices such as heart pacemakers, the discharge step employs a resistive load of 2 to 10 ohms on the battery at its normal operating temperature (i.e. 37° C. body temperature) until the desired amount of discharge is achieved. Typically, this takes less than 2 hours when discharging at 37° C.

EXAMPLES

Sixty Medtronic Zeta 203 lithium/iodine batteries were divided into four groups. Three groups were conditioned at differing times and temperatures (i.e. 16 hours at 60° C.; 4 days at 37° C.; and 10 days at room temperature) prior to a burn-in in which 2 mAh/$cm^2$ of capacity was removed from each cell. One group was subjected to immediate burn-in with no conditioning. The effect of the conditioning was to reduce the impedance of the cell as set forth in Table 1.

TABLE 1

| | 1 KHz AC Impedance, Ohms | | | |
|---|---|---|---|---|
| Conditioning | N | Average | Std. Dev. | Range |
| None | 15 | 229.3 | 17.4 | 192–251 |
| 16 h @ 60° C. | 15 | 50.0 | 1.0 | 48–52 |
| 4 d @ 37° C. | 15 | 108.9 | 5.9 | 91–116 |
| 10 d @ RT | 15 | 187.7 | 13.2 | 163–212 |

The burn-in for each group was conducted at three different discharge rates: a 2 ohm load; 1.5 mA for 8 hours; and 28 µA for 18 days. The amount of time required to complete the burn-in at the 2 ohm load varied according to the conditioning provided to the cell as shown in Table 2.

TABLE 2

| Conditioning | N | Average | Std. Dev. | Range |
|---|---|---|---|---|
| None | 5 | 23.2 h | 2.3 | 18.9–2.52 |
| 16 h @ 60° C. | 5 | 0.65 h | 0.04 | 0.58–0.71 |
| 4 d @ 37° C. | 5 | 0.73 h | 0.07 | 0.61–0.82 |
| 10 d @ RT | 5 | 2.69 h | 0.55 | 1.80–3.20 |

Figure 2:
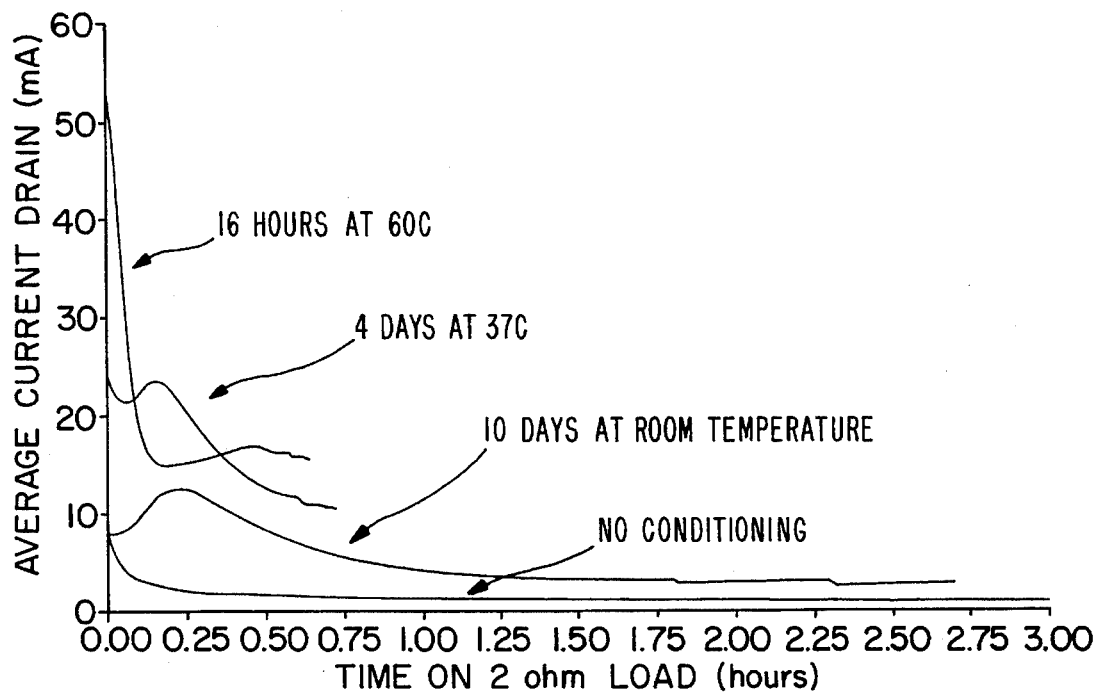
FIG. 2 is a comparative graph showing the current drain profile with a two ohm shorting load at 37° C. for cells which have undergone various cell conditioning times and temperatures.

FIG. 2 presents average current drain profiles versus time for the various test groups discharged by the 2 ohm, 37° C. method. The test cells conditioned at 60° C. for 16 hours show the highest initial current and stabilize at about 15 mA. Cells conditioned at 37° C. for four days have an initial current of about 25 mA and may take only slightly more time to achieve the desired burn-in discharge. The test cells which received no conditioning and those receiving 10 day room temperature conditioning took significantly longer to complete the burn-in discharge.

Figure 3:
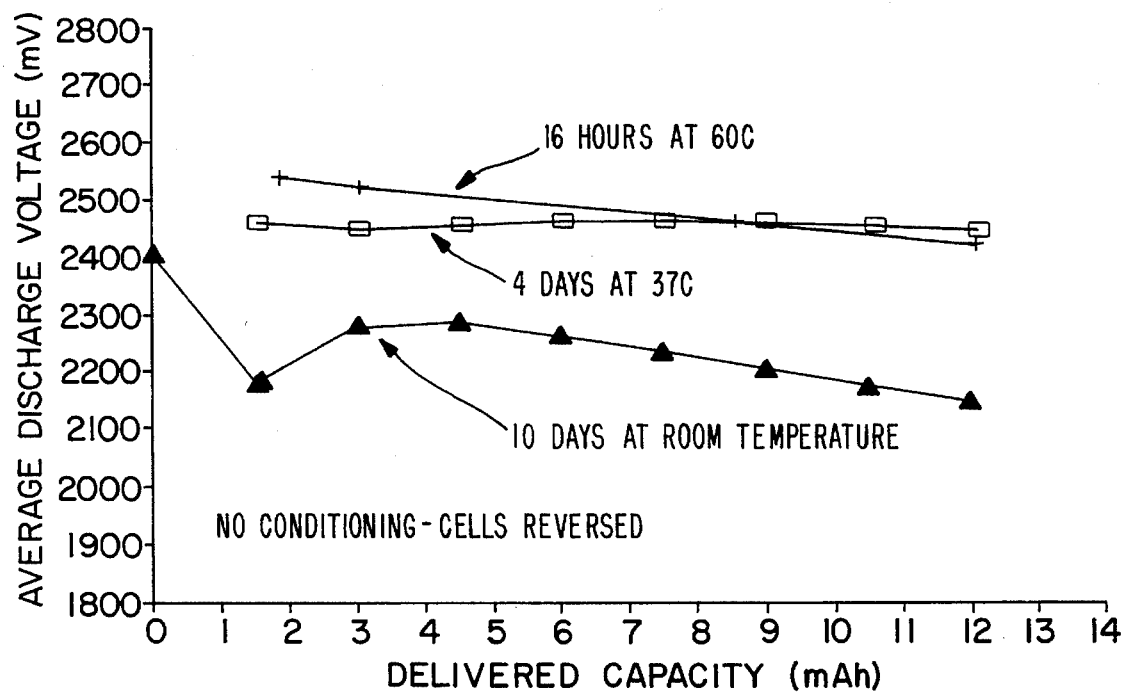
FIG. 3 is a comparative graph showing the voltage profile for a drain at 1.5 mA at 37° C. for cells which have undergone various cell conditioning times and temperatures.
Figure 4:
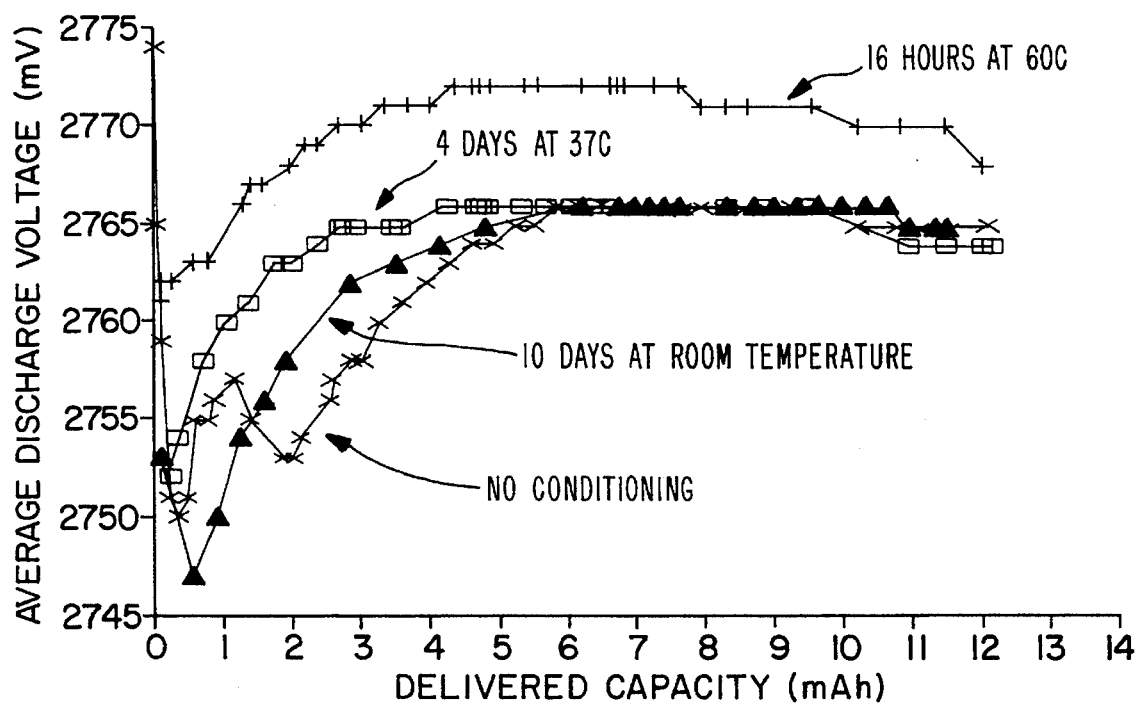
FIG. 4 is a comparative graph showing the voltage profile for a drain at 28 µA at 37° C. for cells which have undergone various cell conditioning times and temperatures.

FIGS. 3 and 4 are average voltage versus capacity plots for the 1.5 mA and 28 µA discharge methods. On FIG. 3, there are no data for the cells with no conditioning because all of the cells reversed almost immediately after being placed on a 1.5 mA discharge. The test cells conditioned at 60° C. for 16 hours and 4 days at 37° C. show similar voltage behavior while cells conditioned at room temperature for 10 days show significantly lower 1.5 mA discharge voltage. On FIG. 4, the 28 µA discharge behavior of cells conditioned at 60° C. for 16 hours show the highest voltage while cells conditioned by the other three procedures show similar behavior with voltages roughly 5 mV lower than the 60° C. conditioned cells.

Figure 5:
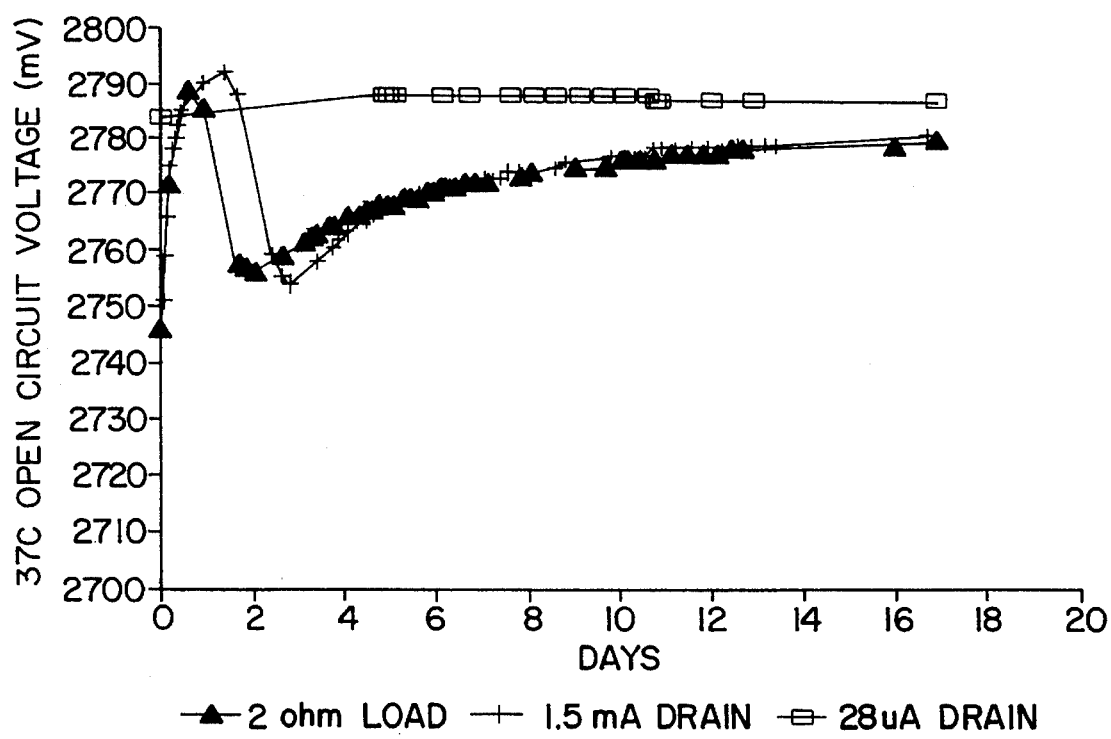
FIG. 5 is a graph showing the open circuit voltage after discharge at various rates for cells not conditioned according to the present invention.
Figure 6:
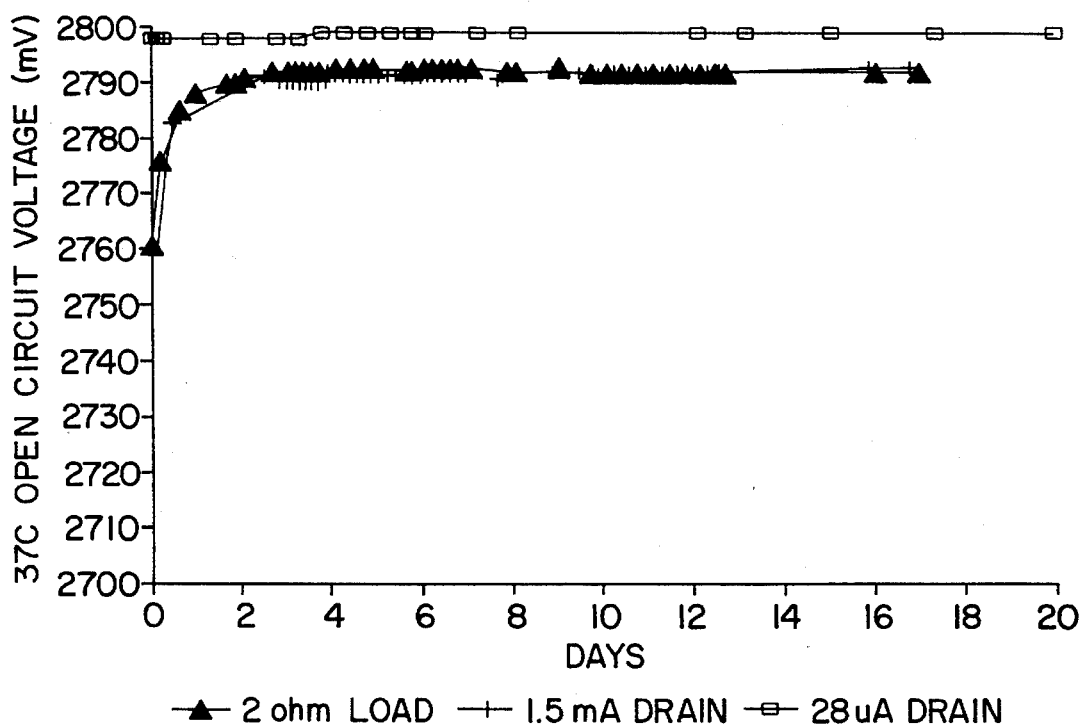
FIG. 6 is a graph showing the open circuit voltage after discharge at various rates for cells conditioned for 16 hours at 60° C.
Figure 7:
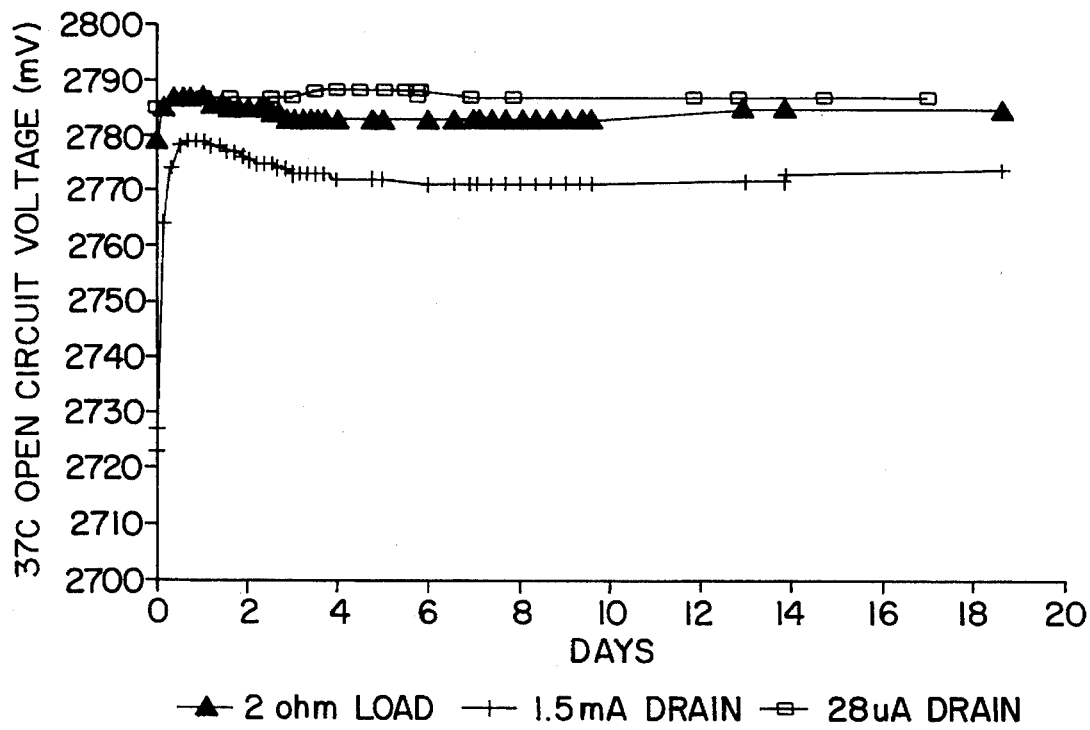
FIG. 7 is a graph showing the open circuit voltage after discharge at various rates for cells conditioned for 4 days at 37° C.
Figure 8:
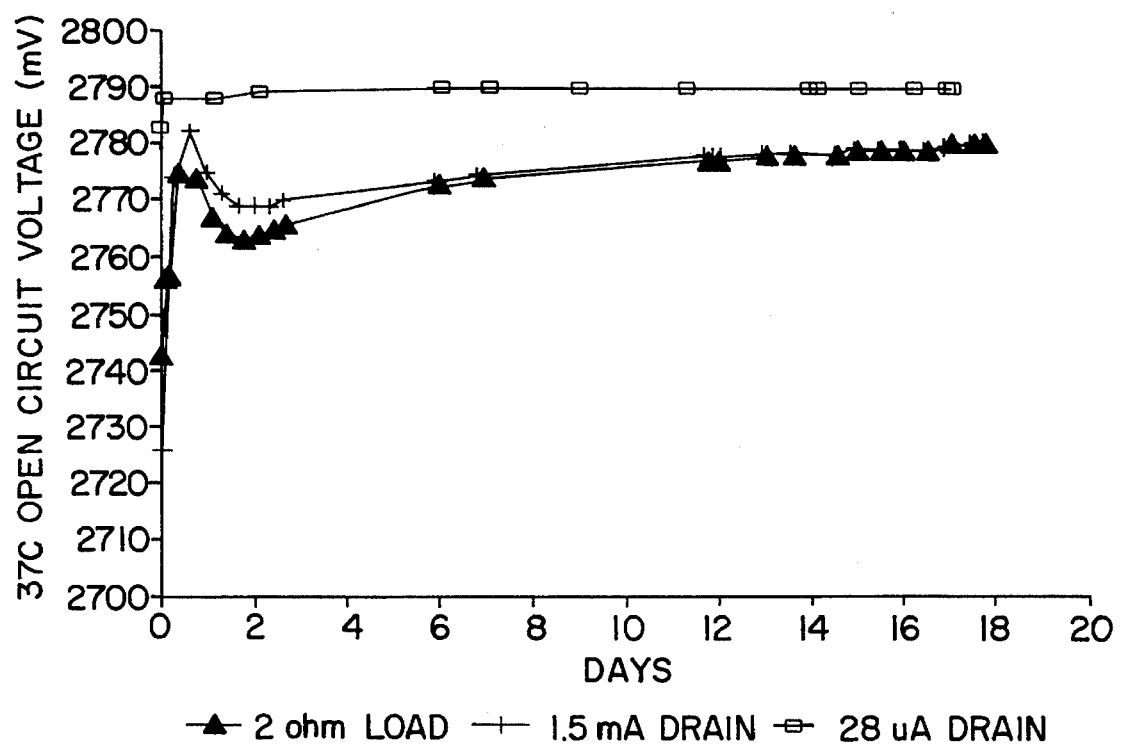
FIG. 8 is a graph showing the open circuit voltage after discharge at various rates for cells conditioned for 10 days at room temperature.

After conditioning and burn-in discharge, all the batteries were monitored for 37° C. open circuit voltage for a period of about 2½ weeks. Average voltage behavior of the various test groups are presented in FIGS. 5–8 where each graph represents data for one of the conditioning methods. As shown in FIG. 5, batteries conditioned for 16 hours at 60° C. show the most desirable open circuit voltage since they rapidly recover to greater than 2790 mV and show stable open circuit voltage over the 37° C. storage period.

During the 37° C. open circuit voltage storage period, heat output and open circuit voltage data were collected on representative test cells from each of the test groups. Table 3 shows the averages for the data collected.

TABLE 3

| Conditioning | 37° C. Heat Output (µW) and voltage (mV) | | | | | |
| --- | --- | --- | --- | --- | --- | --- |
|  | 2 ohm | | 1.5 mA | | 28 µA | |
| None | 98.2* | 2777 | 77.2* | 2779 | 34.5 | 2787 |
| 16 h @ 60° C. | 25.3* | 2792 | 58.7* | 2791 | 17.1 | 2799 |
| 4 d @ 37° C. | 43.6 | 2786 | 174.3 | 2773 | 39.4 | 2787 |
| 10 d @ RT | 97.1 | 2777 | 166.3 | 2777 | 32.5 | 2790 |

*calorimeter with questionable baseline calibration figures are provided for consideration of their relative values only.

Within each test group, the heat output and open circuit voltage were fairly consistent although there are significant differences between the various groups. Overall, the data for cells conditioned with the 16 hour 60° C. method show lower heat output and higher voltage than comparable cells conditioned by other methods.

After 2½ weeks on the 37° C. storage, the test cells were placed on ambient room temperature storage and were again tested for their 37° C. heat output and open circuit voltage about two months after they entered the room temperature storage. Table 4 shows the averages for the data collected.

TABLE 4

| Conditioning | 37° C. Heat Output (µW) and voltage (mV) | | | | | |
| --- | --- | --- | --- | --- | --- | --- |
|  | 2 ohm | | 1.5 mA | | 28 µA | |
| None | 38.1 | 2786 | 28.9 | 2787 | 25.0 | 2788 |
| 16 h @ 60° C. | 15.0 | 2792 | 29.5 | 2793 | 12.7 | 2799 |
| 4 d @ 37° C. | 32.5 | 2788 | 142.0 | 2779 | 27.8 | 2786 |
| 10 d @ RT | 50.5 | 2786 | 76.5 | 2786 | 22.2 | 2791 |

For each of the test groups, the average heat output has decreased from the earlier data in Table 3. Again, the lowest heat output and highest open circuit voltage were in those batteries conditioned at 60° C. for 16 hours; especially for those discharged at a 2 ohm load and at the 28 µA drain.

Overall, the test data indicate that the conditioning and discharge method can significantly affect the initial voltage and heat output of lithium-iodine batteries. The test data also confirm the relationship between battery open circuit voltage and heat output where lower open circuit voltage batteries tend to exhibit higher heat output. Since the higher heat output indicates a higher self-discharge rate for the battery, the conditioning and burn-in procedure has the potential to influence battery longevity. For example, assuming an average heat output of 15 µW for a period of 6 months, the amount of charge removed by self-discharge would only be about 12 mAh or a reduction of longevity of about 1 month at a 15 µA application drain. On the other hand, an average heat output of 140 µW for the same period would remove about 110 mAh, a reduction in longevity of about 10 months at a 15 µA application drain.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. A method for making an electrochemical cell having a lithium anode and an iodine cathode comprising the steps of:

(a) conditioning the cell at a temperature of at least 30° C for a period of time which is effective to produce a reduction in cell impedance; and (b) subjecting the conditioned cell to discharge until the amount of such discharge reaches at least 2 mAh per $cm^2$ of the lithium anode surface, the conditioning and discharge steps carried out as separate steps prior to placing the cell into service or storage.

2. A method according to claim 1 wherein the cell is conditioned to reduce impedance at least 15%.

3. A method according to claim 2 wherein the cell is conditioned to reduce impedance in the range of about 50–80%.

4. A method according to claim 1 wherein the cell is conditioned at a temperature in the range of about 45°–75° C.

5. A method according to claim 1 wherein the cell is conditioned at a temperature of about 75° C. for one to four hours.

* * * * *